United States Patent
Tezuka et al.

[19]

[11] Patent Number: 5,839,202
[45] Date of Patent: Nov. 24, 1998

[54] MANUAL THREE DIMENSIONAL COORDINATE MEASURING MACHINE

[75] Inventors: Kazusaku Tezuka, Kawasaki; Takao Oneta, Utsunomiya, both of Japan

[73] Assignee: Mitutoyo Corporation, Kawasaki, Japan

[21] Appl. No.: 715,384

[22] Filed: Sep. 12, 1996

[30] Foreign Application Priority Data

Sep. 18, 1995 [JP] Japan .................................. 7-238372

[51] Int. Cl.⁶ .................................................. G01B 5/004
[52] U.S. Cl. ............................... 33/503; 33/556; 33/559; 33/561
[58] Field of Search .............................. 33/503, 556, 557, 33/558, 559, 560, 561, 832, 1 M, 1 PT, 504

[56] References Cited

U.S. PATENT DOCUMENTS

| | | | |
|---|---|---|---|
| 4,625,417 | 12/1986 | Cusack | 33/556 |
| 4,910,879 | 3/1990 | Golinelli et al. | 33/559 |
| 5,111,592 | 5/1992 | Aehnelt et al. | 33/558 |
| 5,222,304 | 6/1993 | Butler | 33/558 |
| 5,257,461 | 11/1993 | Raleigh et al. | 33/1 M |
| 5,430,948 | 7/1995 | Vander Wal, III | 33/503 |
| 5,509,211 | 4/1996 | Ernst | 33/558 |

FOREIGN PATENT DOCUMENTS

54-107763  8/1979  Japan .

*Primary Examiner*—Diego F. F. Gutierrez
*Assistant Examiner*—Andrew Hirshfeld
*Attorney, Agent, or Firm*—Oliff & Berridge, PLC

[57] ABSTRACT

A manual three dimensional coordinate measuring machine has a probe manually movable along three orthogonal coordinate axes, X, Y and Z, and a Z axis member supporting the probe. The size and shape of a workpiece is determined by displacements along the three axes from a predetermined origin when the probe contacts the workpiece. The manual coordinate measuring machine further includes a slide ring positioned at the bottom side of the Z axis member and at least one elastic member. The slide ring is movable in an arbitrary direction relative to the Z axis and along the Z axis. The slide ring is held at a predetermined position in the plane and along the Z axis by the at least one elastic member. The at least one elastic member allows the slide ring to move in the plane or along the Z axis by elastic deformation of the at least one elastic member in response to a force which is larger than a predetermined value.

34 Claims, 8 Drawing Sheets

MANUAL THREE DIMENSIONAL COORDINATE MEASURING MACHINE

BACKGROUND OF THE INVENTION

1. Field of the Invention

This invention relates to coordinate measuring machines. In particular, this invention relates to a manual or floating-type coordinate measuring machine having a probe which is movable along three orthogonal coordinate axes, X, Y and Z. The probe is provided on a Z axis member, which is manually movable along the three coordinate axes. The size and shape of a workpiece is determined by the displacements along the three axes from a predetermined origin as the probe contacts the workpiece.

2. Description of the Related Art

Manual three dimensional coordinate measuring machines (CMM) are known. Such CMMs have a probe which is manually movable along three orthogonal coordinate axes, X, Y and Z, by an operator. The probe is provided on a tip or bottom of the Z axis member. The size and shape of a workpiece is determined by the displacement of the probe along the three axes from a predetermined origin as the probe contacts the workpiece.

The structure of such manual three dimensional coordinate measuring machines is simpler than that of automatically driving coordinate measuring machines. Automatic CMMs are automatically movable along three axes by means of driving mechanisms provided for these axes. The manual CMMS, on the other hand, have probes which are rapidly movable toward a given direction or place by the hand of the operator. Manual CMMs, however, are prone to problems during manual operation, including: (i) force being applied to the tip of the Z axis member to deflect the tip; and (ii) the forces applied to the tip during operation vary from operator to operator. Due to these problems, the accuracy of manual CMMs decreases because each operator moves the Z axis member with his own velocity or acceleration. Additionally, in manual three dimensional coordinate measuring machines which use air bearings as sliding mechanisms for the three axes, the accuracy decreases due to the gap variation in the air bearings.

A mechanism for decreasing the deflection of the Z axis member is described in Japanese Unexamined Patent Publication No. 54-107763. In the manual CMM described in this reference, the bottom of the Z axis, which is provided with a probe or sensing element, has a pair of blade springs provided parallel to the Z axis. The tops of the blade springs are fixed to the Z axis. The bottoms of the blade springs can be displaced in the X axis. A handling flange is provided at the bottom of the parallel blade springs. An X axis movement sensor, comprising two limit switches, and opposed to a respective one of the blade springs for sensing movement of the blade springs and a Y axis movement sensor having the same configuration are provided perpendicular to the Z axis. Mechanisms for imparting auxiliary forces are provided on two axes.

In operation of the manual CMM described in this reference, air is jetted in the reverse direction of movement detected by the movement sensors to impart a thrust smaller than the frictional resistance in the detected direction. When the probe is moved in the X axis and Y axis directions while holding the handling flange, the blade springs are displaced toward such directions to jet air in the reverse direction of the movement. Thus, hysteresis errors due to the deflections in the X and Y directions can be eliminated and the accuracy can be improved.

Because the configuration set forth above, however, requires the X axis and Y axis movement sensors each having a pair of parallel blade springs and the mechanisms for imparting the auxiliary forces, the structure of this apparatus is complicated and the deflection further increases due to the increased weight of the apparatus provided for each axis. Furthermore, because two X axis and two Y axis movement sensors must be provided perpendicular to the Z axis, the structure is further complicated.

Moreover, because the configuration set forth above eliminates hysteresis errors due to the X axis and Y axis deflections formed when the Z axis moves, (in other words, formed by movement from the static state) the moving direction must be detected before the Z axis moves in the X axis or Y axis direction. Thus, the parallel blade springs of each movement sensor must be displaced by a small force. However, when the Z axis moves with a great deflection of the blade springs, the probe can contact the workpiece. Thus, the forces applied to the tip of the Z axis member vary from operator to operator and the measured accuracy remains low.

SUMMARY OF THE INVENTION

This invention thus provides a manual three dimensional coordinate measuring machine having a simplified structure and an improved measurement accuracy which is not dependent on the operator.

This invention further provides a manual three dimensional coordinate measuring machine which enables a manual operation, such that when a probe contacts a workpiece, the acceleration is suppressed to at most a predetermined value just before the probe contacts the workpiece.

This invention also provides a manual three dimensional coordinate measuring machine which achieves a highly accurate measurement by automatically eliminating data obtained when the probe contacts the workpiece at too large an acceleration.

In the manual three dimensional coordinate measuring machine constructed in accordance with this invention, a probe is provided on a Z axis member and is manually movable along three orthogonal coordinate axes, X, Y and Z. The size and shape of a workpiece is determined by the displacements along the three axes from a predetermined origin as the probe contacts the workpiece. The manual CMM includes:

a slide ring provided at a bottom side of a Z axis member, the slide ring movable in an arbitrary direction relative to the Z axis, the slide ring held at a predetermined position relative to the Z axis; and at least one elastic member holding the slide ring at the predetermined position relative to the Z axis and allowing the slide ring to move in an arbitrary direction relative to the Z axis by elastic deformation of the at least one elastic member in response to a force larger than a predetermined value.

The bottom side of the Z axis member also includes a position lower than the bottom end of the Z axis member provided by, for example, positioning a probe adaptor at the bottom end of the Z axis member, as well as the bottom section of the Z axis member.

According to this structure, the probe contacts the workpiece to generate a measurement while the operator holds the slide ring and moves the probe along three coordinate axes. When the probe moves along the X axis and Y axis and a force larger than a predetermined value acts on the slide ring, in, for example, a plane (XY plane) perpendicular to the Z axis, the at least one elastic member is elastically deformed. The operator holding the slide ring can perceive the deformation of the at least one elastic member as a motion of the slide ring. Because the probe can contact the workpiece while the velocity of the probe decreases, the at least one elastic member is elastically deformed. This elastic deformation suppresses the acceleration to at most a predetermined value just before the probe contacts the workpiece. Therefore, a force acting on the slide ring (or a force relative to the Z axis) can be readily maintained at a predetermined value or less. Therefore, the variation in the measurement accuracy dependent on the operator can be decreased. Further, the structure is simplified by the combination of the slide ring with the at least one elastic member.

In the manual three dimensional coordinate measuring machine described above, the slide ring is preferably provided at the bottom of the Z axis and at the periphery of the probe adaptor which detachably holds the probe. The at least one elastic member is preferably provided between the slide ring and the probe adaptor. By this structure, the slide ring can be attached to the Z axis member without any additional work and the probe can be detachably held on the Z axis member of an existing manual three dimensional coordinate measuring machine. Thus, the machine can be fabricated with a low cost.

In the manual three dimensional coordinate measuring machine described above, an annunciating means is preferably provided to announce when a predetermined amount of movement of the slide ring has occurred. By this structure, the probe contacts the workpiece while the operator watches the annunciating means to determine when the slide ring has moved the predetermined amount.

In the manual three dimensional coordinate measuring machine described above, an error preventing means is also preferably provided to cancel recording the displacements of the three coordinates based on a touch signal. The error preventing means determines when the probe has contacted the workpiece at too great an acceleration by measuring whether the slide ring has moved a second predetermined amount. By this structure, the data is automatically discarded when the probe contacts the workpiece at a substantial acceleration, resulting in an improvement in the measurement accuracy.

These and other features and advantages of this invention are described in or apparent from the following detailed description of the preferred embodiments.

BRIEF DESCRIPTION OF THE DRAWINGS

The preferred embodiments of this invention will be described with reference to the accompanying drawings, wherein.

DETAILED DESCRIPTION OF THE PREFERRED EMBODIMENTS

Figure 1:
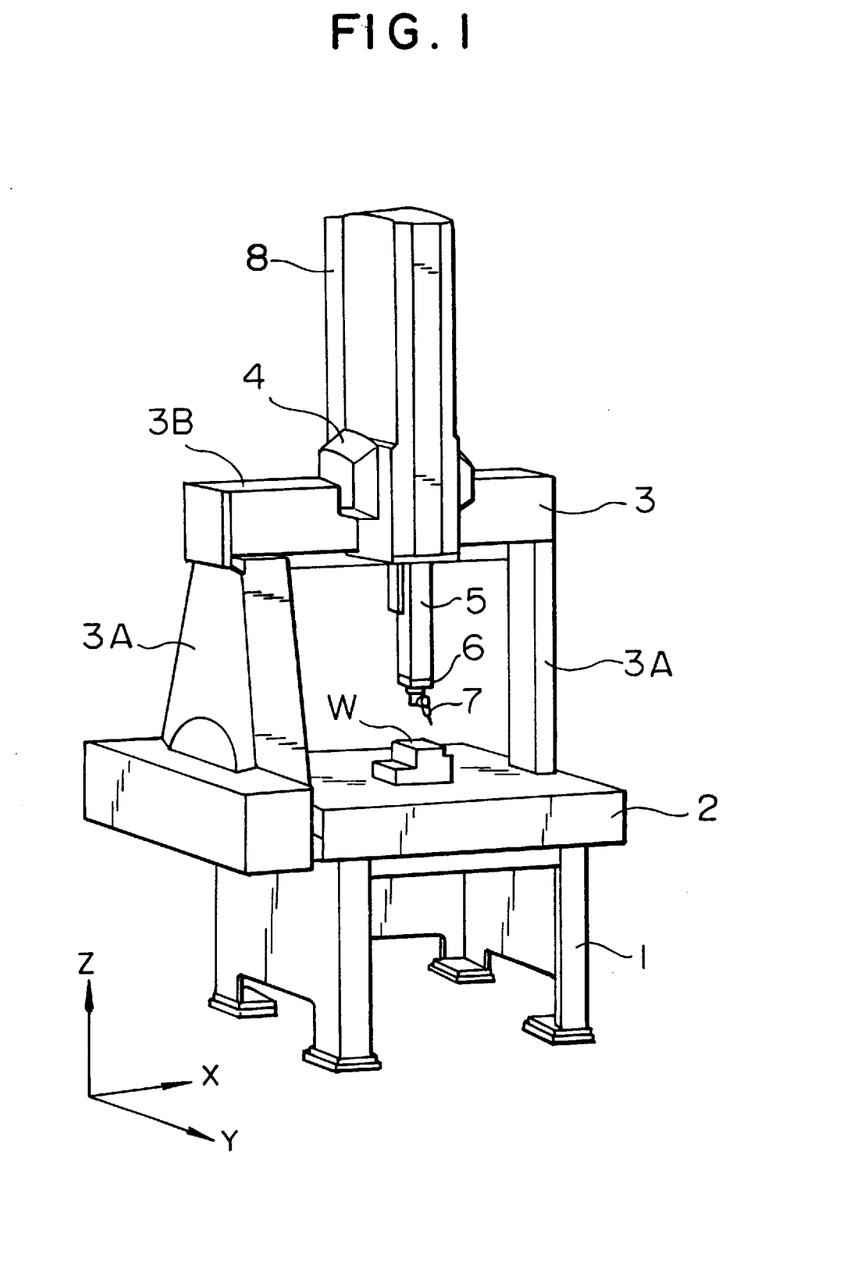
FIG. 1 is an isometric view of a manual three dimensional coordinate measuring machine of this invention.
Figure 2:
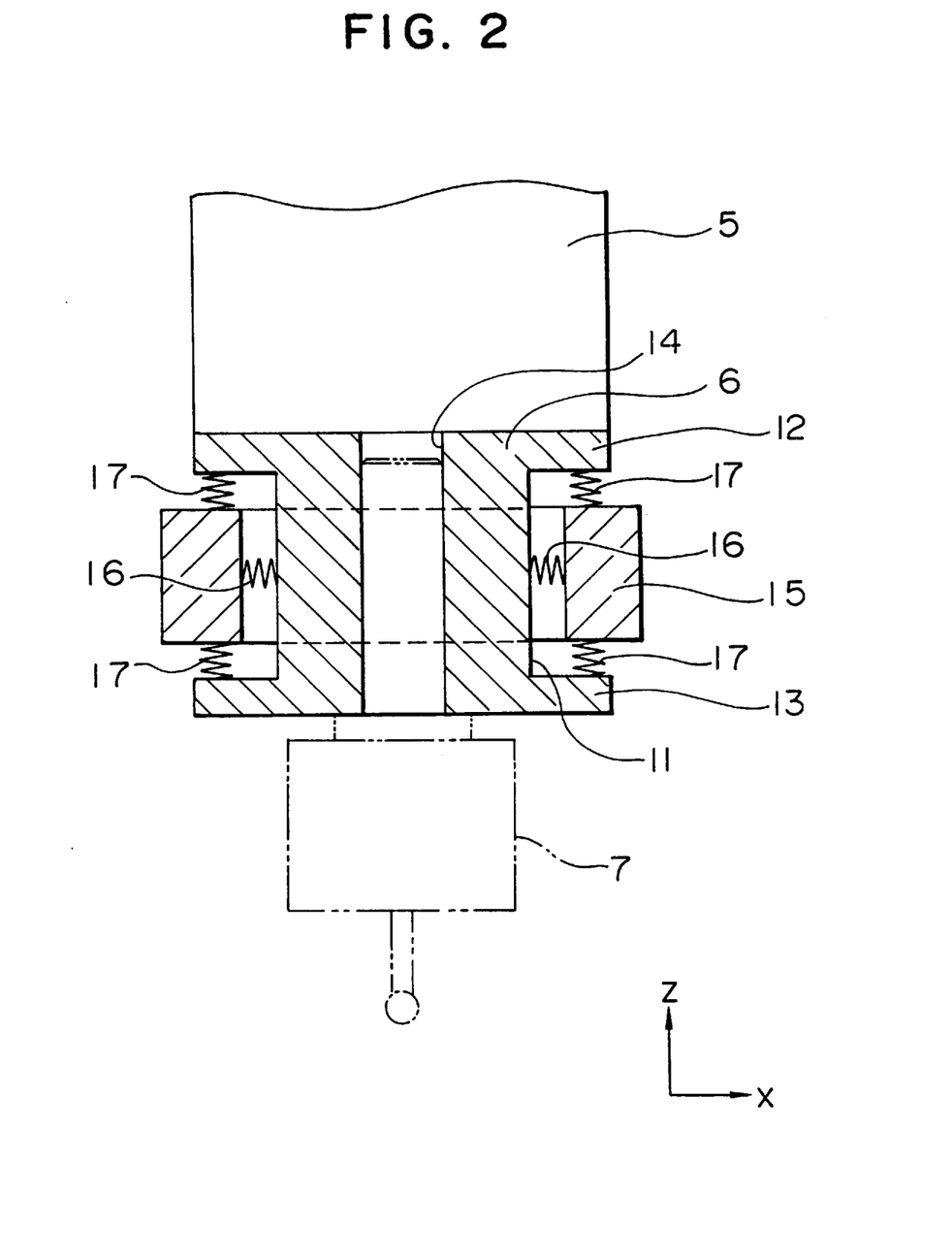
FIG. 2 is a partial cross-sectional side view of a probe adaptor section of a first embodiment of this invention.
Figure 3:
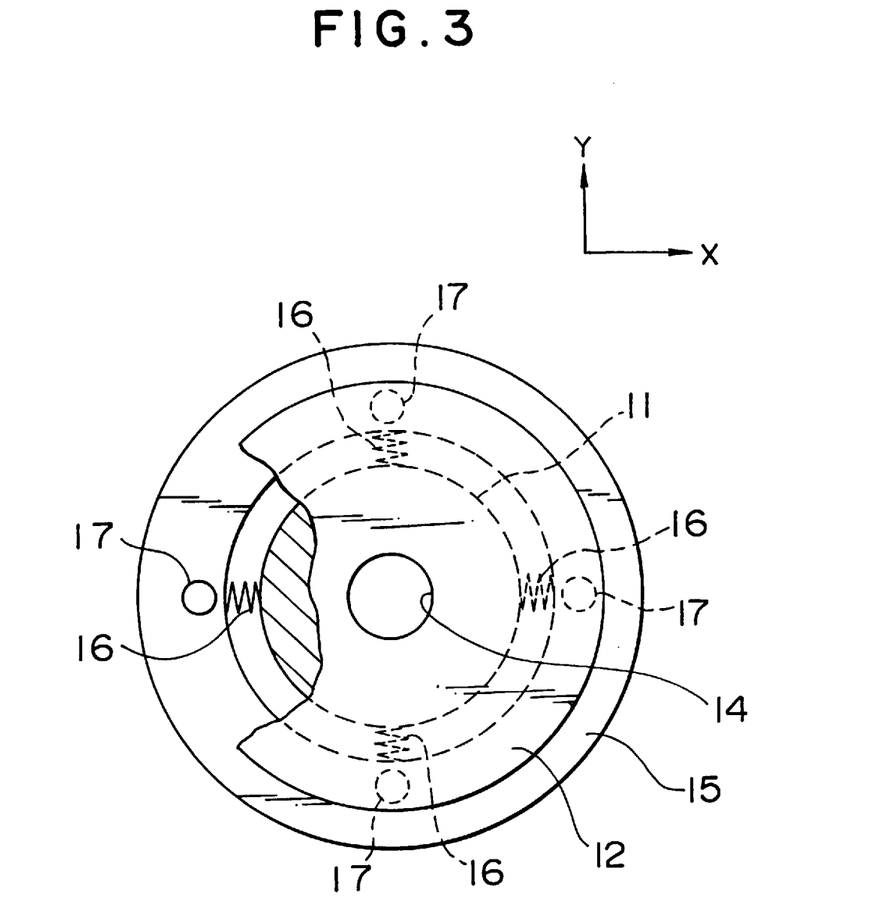
FIG. 3 is a top plan view and partial cut away cross-sectional view of the probe adaptor of FIG. 2.

A first preferred embodiment of this invention is shown in FIGS. 1 to 3. As shown in FIG. 1, the manual three dimensional coordinate measuring machine includes a stand 1, a table 2 provided on the stand 1 for supporting a workpiece W, a gate type column 3 which is movable between the front and rear of the table 2, i.e., along the Y coordinate axis, an X axis slider 4 which is movable between the left and right sides of an X axis beam 3B of the gate type column 3, i.e., along the X coordinate axis, a Z axis spindle 5 functioning as a Z axis member which is vertically movable along the X axis slider 4, i.e., along the Z coordinate axis, and a probe 7 which is detachably positioned at the bottom of the Z axis spindle by a probe adaptor 6. A balancer 8 is provided for balancing the weight of the Z axis spindle 5.

Air bearings are provided between the table 2 and both legs 3A of the gate type column 3, between the X axis beam 3B and the X axis slider 4, and between the X axis slider 4 and the Z axis spindle 5. Thus, the gate type column 3, the X axis slider 4 and the Z axis spindle 5 can be manually moved by exerting only a slight force. When the probe 7 contacts the workpiece W while moving along one or more of the three orthogonal coordinate axes, i.e., the X, Y and Z axis, the displacements of these axes from a predetermined origin are input from a displacement detector (not shown) by a displacement recording device (not shown) in response to a touch signal. The size and shape of the workpiece W is then determined based on the recorded displacement data.

As shown in FIGS. 2 and 3, the probe adaptor 6 comprises a cylinder body 11. Flanges 12 and 13 are monolithically formed with the body 11 and have a larger diameter than the body 11. A holding hole 14 is formed on the center of the body 11 and extends between the flange 12 to the flange 13. A bolt (not shown) detachably holds the probe 7 to the probe adaptor 6. An annular slide ring 15 is provided on the outside of the Z spindle 5 so that the slide ring 15 can move in any direction in a plane (such as the XY plane) relative to the Z axis and along the axis of the Z axis spindle 5 (i.e., along the Z axis). The travel limits of the slide ring 15 in the XY plane and along the Z axis direction are set to a value which the operator can perceive by hand. That is, the operator can perceive the movement of the slide ring 15 when moving the Z axis spindle by holding the slide ring in his/her hand. This value is, for example, 2 mm.

A number of compressed coil springs 16 are provided between the inside of the slide ring 15 and the outside of the body 11. The coil springs 16 act as elastic members. Preferably, 4 coil springs 16 are provided at intervals of 90 degrees around the body 11 and slide ring 15. The coil springs 16 hold the slide ring 15 at a predetermined position in the XY plane. The coil springs 16 allow the slide ring 15 to move in the XY plane by elastic deformation due to a force larger than a predetermined value. The force can be applied to the slide ring 15 in an arbitrary direction in the XY plane. Further, a number of compressed coil springs 17 are provided between the top end of slide ring 15 and the flange 12 and between the bottom end of slide ring 15 and the flange 13. The coil springs 17 also act as elasic members and are also at intervals of 90 degrees around the flanges 12 and 13 and slide ring 15. The coil springs 17 hold the slide ring 15 at a predetermined position along the Z axis. The coil springs 17 allow the slide ring 15 to move in the Z axis by elastic deformation due to a force larger than a predetermined value. The force can be applied to the slide ring 15 along the Z axis.

In the first preferred embodiment, the operator lets the probe 7 contact the workpiece W while holding the slide ring 15 with one hand and manually moving the probe 7 along the X axis and the gate type column 3 along the Y axis. When moving the probe 7, if the velocity or acceleration of the probe 7 exceeds the predetermined value, a force higher than the predetermined value acts on the slide ring 15. Thus, the compressed coil springs 16 and 17 are elastically deformed. For example, when a force higher than the predetermined value acts on the slide ring in an arbitrary direction in the XY plane, one or more of the compressed coil springs 16 are elastically deformed.

When this occurs, the operator holding the slide ring 15 perceives the movement of the slide ring 15. Thus, the operator can control the force when the probe contacts the workpiece W by reducing the velocity of the probe 7. This ensures that the compressed coil springs 16 and 17 elastically deform just before the probe contacts the workpiece W. Additionally, the deflection of the Z axis spindle 5 along the X and Y axes and the deflection of the X axis beam 3B along the Y axis can be suppressed. Thus, because the floating variations of the X axis slider 4 and the gate type column 3 are limited, a high accuracy measurement can be achieved.

The structure of the slide ring 15 and the compressed coil springs 16 and 17 is significantly simplified compared to the conventional device. In particular, the structure for allowing the slide ring 15 to move along the XY plane and the Z axis is extremely simplified compared with the prior art structure set forth above which has two movement sensors with parallel blade springs at intervals of 90 degrees. Furthermore, as the slide ring 15 is positioned on the outside of the probe adaptor 6 and is detachably held to the Z axis spindle 5, no additional working is required for attaching the slide ring 15 to the Z axis spindle 5. Accordingly, the probe adaptor can be used for any existing manual three dimensional coordinate measuring machine with a reduced cost.

Figure 4:
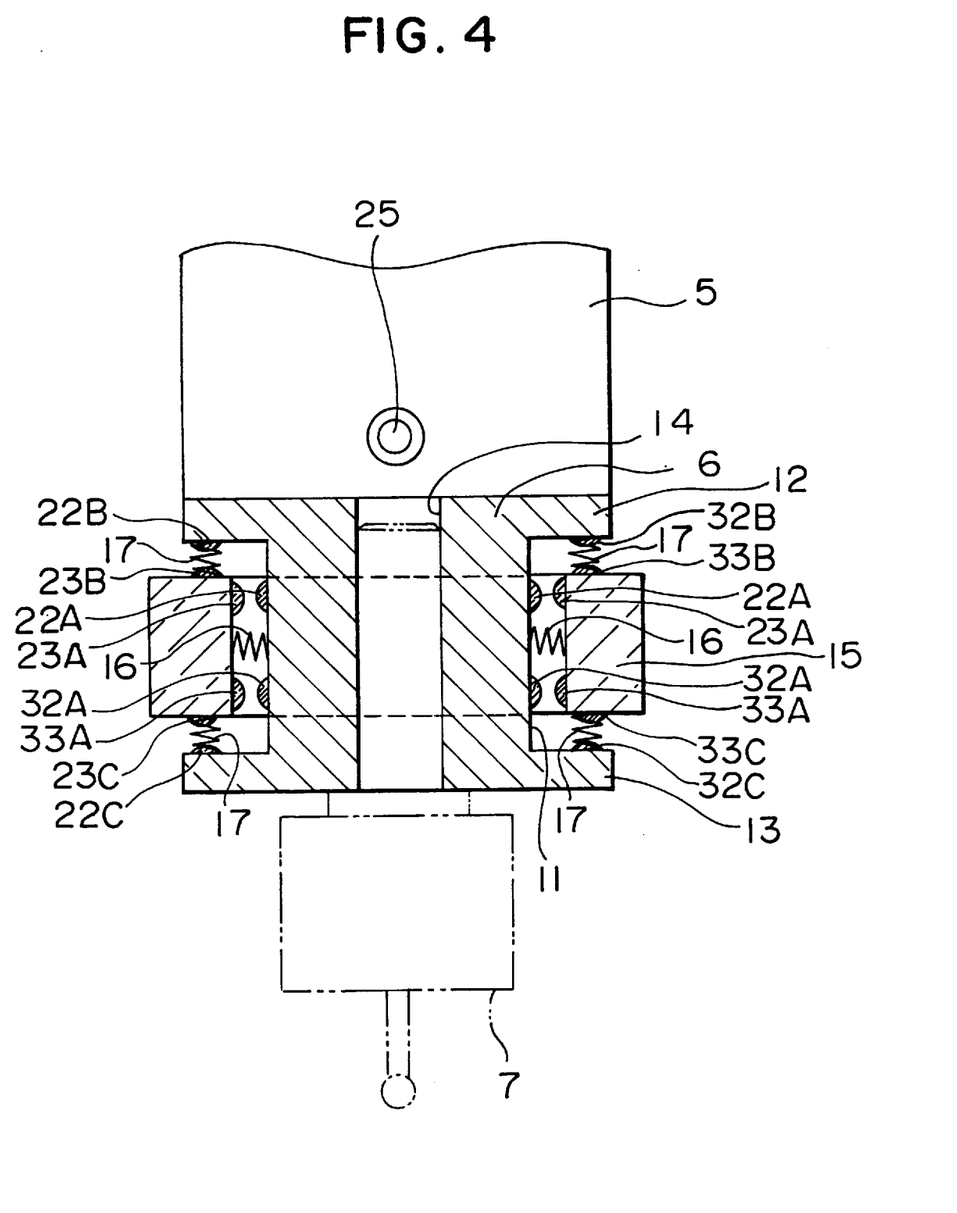
FIG. 4 is a partial cross-sectional side view of a second embodiment of the probe adaptor section of this invention.
Figure 5:
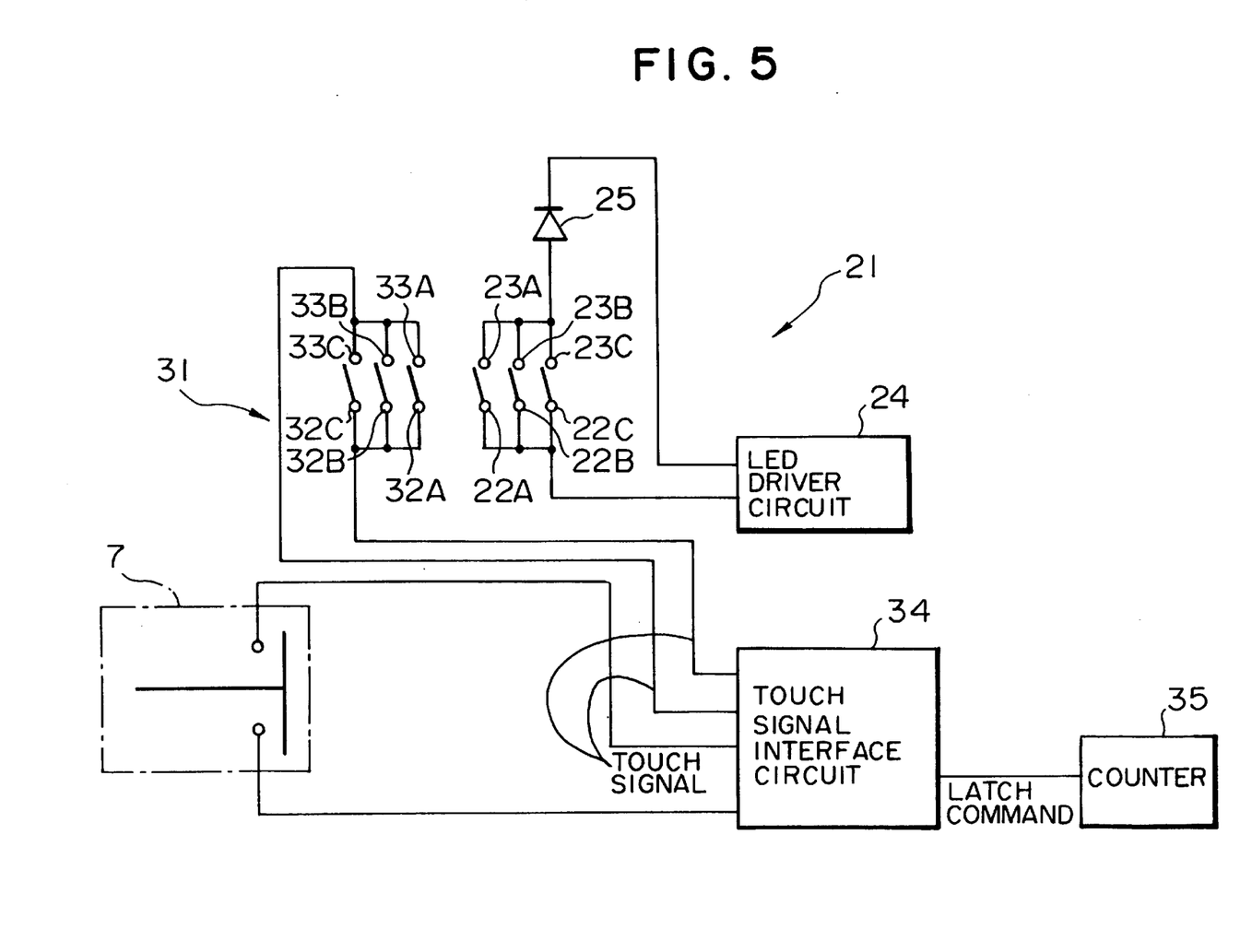
FIG. 5 is a block diagram of an annunciating means and an error preventing means of the second embodiment of this invention.

FIGS. 4 and 5 show a second preferred embodiment in accordance with this invention. The second preferred embodiment of the apparatus includes an annunciation circuit 21 for indicating a predetermined movement of the slide ring 15. It also includes an error preventing circuit 31 for determining when to discard the displacements along the three coordinates recorded when the probe contacts the workpiece.

As shown in FIG. 4, the annunciation circuit 21 includes a first fixed contact 22A provided on the periphery of the body 11 of the probe adaptor 6. A second fixed contact 22B is provided on the bottom face of the flange 12. A third fixed contact 22C is provided on the top face of the flange 13. Similarly, a first moving contact 23A, a second moving contact 23B and a third moving contact 23C are provided on the interior, top and bottom faces of the slide ring 15, respectively. One or more of the moving contacts 22A–C contact their respective fixed contacts 23A–C when the slide ring 15 moves in the XY plane and/or the Z axis by the predetermined displacement. The annunciation circuit 21 further includes an LED driver circuit 24 and an LED 25. The LED 25 is positioned at the bottom of the Z axis spindle and emits light when one or more of the moving contacts 23A–C connect to their respective fixed contacts 22A–C.

As shown in FIG. 4, the error preventing circuit 31 includes a first fixed contact 32A provided on the periphery of the body 11 of the probe adaptor 6. A second fixed contact 32B is provided on the bottom face of the flange 12. A third fixed contact 32C is provided on the top face of the flange 13. Similarly, a first moving contact 33A, a second moving contact 33B and a third moving contact 33C are provided on the inner, top and bottom faces of the slide ring 15, respectively. One or more of the contacts 33A–C contact their respective fixed contacts 32A–C when the slide ring 15 moves in the XY plane and/or the Z axis by the predetermined displacement. The error preventing circuit 31 further includes a touch signal interface circuit 34 and a counter 35. The touch signal(s) generated when at least one of the moving contacts 33A–C connect to their respective fixed contacts 32A–C are input to the touch signal interface circuit 34. The touch signal interface circuit 34 generates a latch command to the counter 35 when the probe 7 contacts the workpiece W, unless the touch signal is generated. In this case, the touch signal cancels the latch command to the counter 35 when one or more of the moving contacts 23A–C and 32A–C contact the corresponding ones of the fixed contacts 22A–C and 32A–C.

With the above configuration, the annunciation circuit 21 and error preventing circuit 31 are triggered by a movement meeting or exceeding the predetermined value in either the XY plane and/or the Z axis. For example, sufficient upward movement of the slip ring 15 connects the second moving contacts 23B to the second fixed contacts 22B (as shown in upper left portion of FIG. 4). It will also cause the second moving contact 33B to contact the second fixed contact 32B (as shown in upper right portion of FIG. 4). Likewise, sufficient downward movement of the slide ring 15 will force the moving contacts 23C and 33C to contact the fixed contacts 22C and 32C, respectively. Similarly, with sufficient movement in the XY plane, the moving contacts 23A and 33A (on either side of FIG. 4) move to contact fixed contacts 22A and 32A (on either side of FIG. 4).

In the second preferred embodiment, when the slide ring 15 moves by the predetermined value while moving the probe 7, the LED 25 in the annunciation circuit 21 is turned on. Thus, the operator can let the probe 7 contact the workpiece W while moving the slide ring to avoid turning on the LED 25. Accordingly, the force acting on the slide ring 15 is suppressed to the predetermined value or less. Thus, the measurement accuracy can be securely improved.

Even if the probe 7 contacts the workpiece W when the LED 25 is turned on, storing or recording the displacements of the three axes is prevented by the error preventing circuit 31. Thus, recording a measurement having an essential error can be prevented.

It should be appreciated that the shape of the contacts 22A–C, 23A–C, 32A–C and 33A–C can be any shape that will ensure the electric circuit is clearly closed by contact between the corresponding contacts. As illustrated, the contacts are hemispherically shaped. However, the shapes of the contacts are not limited to this shape. For example, the contacts may extend along the circumference of the slide ring 16 and the body 11. Futhermor, the cross-sectional shape of the contacts can be square, rectangular, trapezoidal, or any polyagonal shape. Furthermore, the contacts may be completely annular so as to extend completely around the slide ring 15, and the body 11 and the flanges 12 and 13. It should be appreciated that contacts 23B and 33B, 22B and 32B, 23C and 33C, and 22C and 32C will be located concentrically on their respective surfaces of the adapter or slip ring 15.

Each of the annunciating circuit 21 and the error preventing circuit 31 has a simplified configuration as set forth above. Further, the fixed contacts 22A–C and the moving contacts 23A–C of the annunciating circuit 21 and the fixed contacts 32A–C and the moving contacts 33A–C of the error preventing circuit 31 can be replaced with common contacts. For example, the fixed contacts 32A–C and the moving contacts 33A–C can be omitted. In this case, the fixed contacts 22A, 22B and 22C and the moving contacts 23A, 23B and 23C can be connected to both the touch signal interface 34 and to the LED driver circuit 24. This results in an even further simplified circuit configuration.

Figure 6:
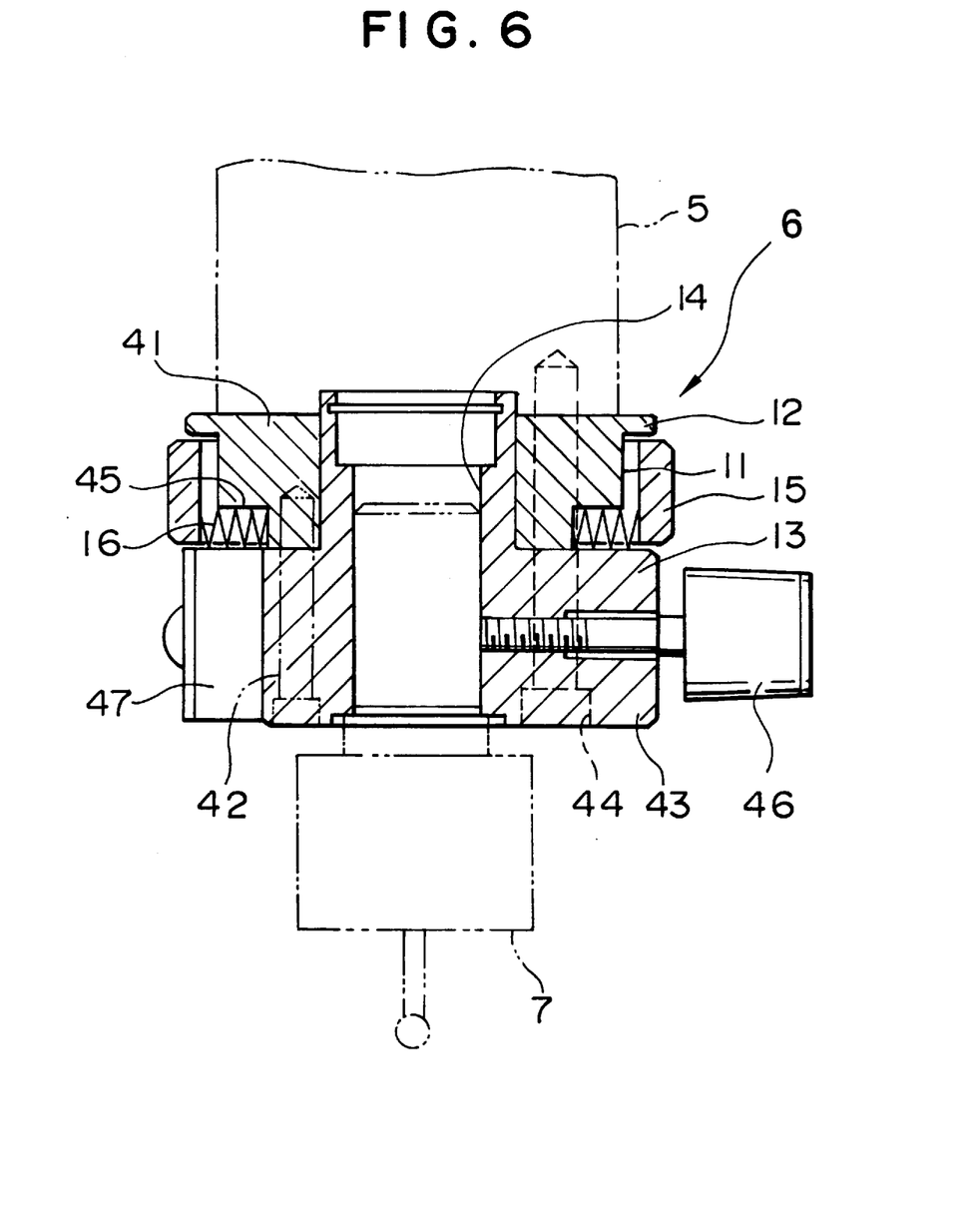
FIG. 6 is a partial cross-sectional side view of a third embodiment of the probe adaptor section of this invention.
Figure 7:
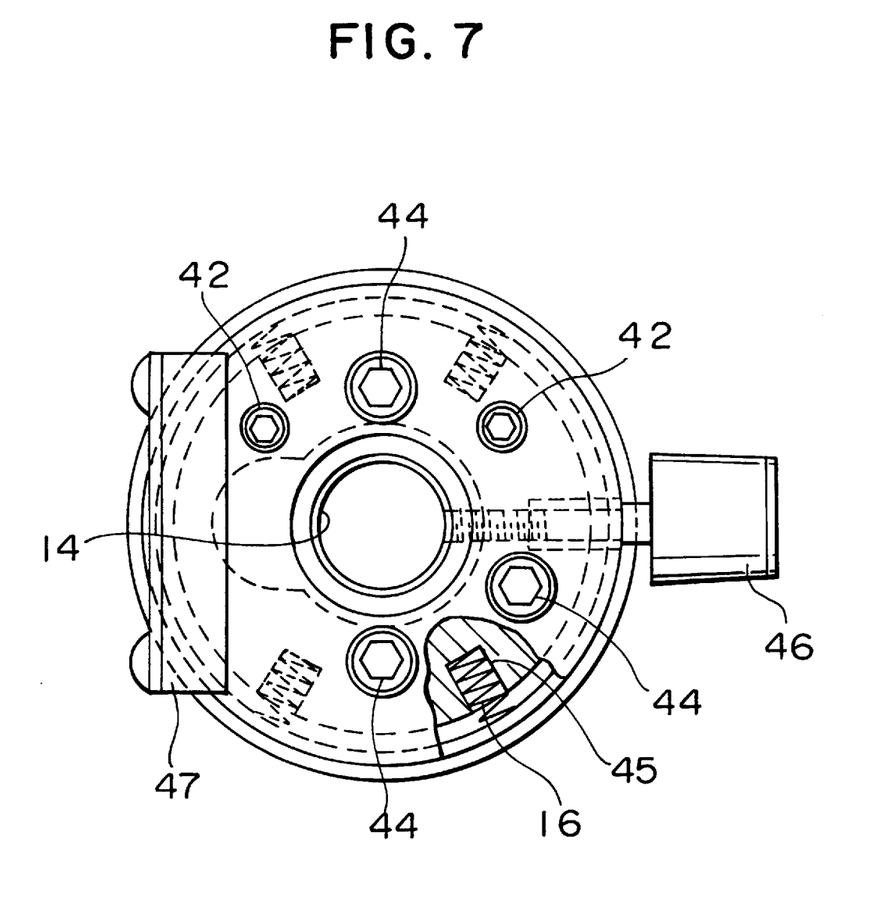
FIG. 7 is a top plan view and partial cut away cross-sectional view of the probe adaptor of FIG. 6.

FIGS. 6 and 7 show a third preferred embodiment of this invention. In this third preferred embodiment, the slide ring 15 moves only in the XY plane relative to the spindle Z-axis. The probe adaptor 6 includes two members, a ring mounting body 41 and probe holding member 43. The ring mounting member 41 has a body 11 and a flange 12. The probe holding member 43 has a flange 13 and a holding hole 14. The probe holding member 43 is attached to the bottom face of the ring mounting member 41 with two bolts 42. The probe adaptor 6 is mounted to the bottom face of the Z axis spindle 5 with three bolts 44.

The ring mounting member 41 has four spring holding holes 45 for holding the compressed coil springs 16. A clamping screw 46 is screwed into the probe holding member 43 to clamp the shank of the probe 7 inserted into the holding hole 14. The probe holding member 43 is also provided with a connector case 47 for passing wire from the probe 7 the Z axis spindle 5.

According to the third preferred embodiment, deflection of the Z axis spindle in the XY plane and deflection of the X axis beam 3B in the Y direction can be reduced due to the movement of the slide ring 15 in only the XY plane. As in the second preferred embodiment, the annunciation circuit 21 and the error preventing circuit 31, as described above, can be provided between the adaptor 6 and the slip ring 15.

Although this invention has been described in its preferred forms, it should be understood that this invention is not limited to the preferred forms outlined above. Changes and variations may be made to these described preferred forms without departing from the spirit or scope of this invention.

For example, the slide ring 15 can be directly attached to the bottom of the Z axis spindle 5, differing from the embodiments set forth above in which the probe adaptor 6 is provided between the slide ring 15 and the bottom of the Z axis spindle 5.

Figure 8:
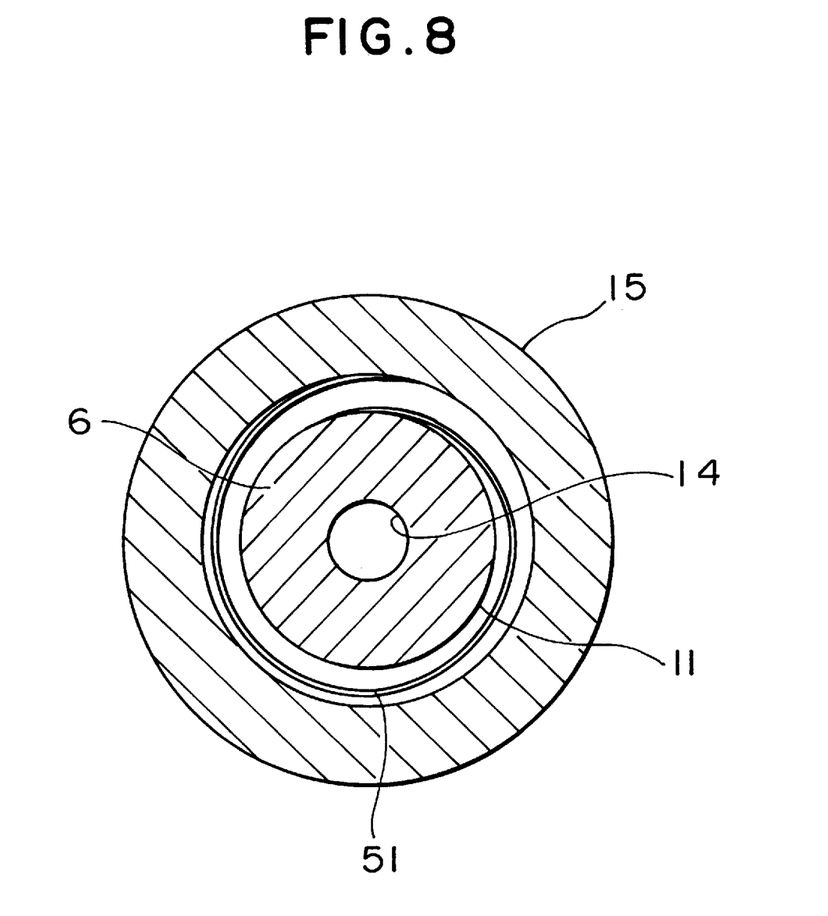
FIG. 8 is a cross-sectional view of another embodiment of the elastic member of this invention.

The plan view of the slide ring 15 may be a shape other than circular, for example, square, etc. The compressed coil springs 16 and 17 functions can be replaced with blade springs, rubber members, wire springs and the like. As shown in FIG. 8, when using a wire spring 51, the wire spring 51 is spirally coiled along the periphery of the body 11 of the probe adaptor 6. One end of the wire spring 51 is attached to the probe adaptor 6, while the other end of the wire spring 51 is attached to the slide ring 15.

What is claimed is:

1. A manual three dimensional coordinate measuring machine, comprising:
   a first axis member extending along a first one of three orthogonal coordinate axes and manually movable with respect to at least one of the three orthogonal coordinate axes;
   a probe supported by the first axis member and movable relative to the first axis member;
   a slide ring positioned at a bottom side of the first axis member, the slide ring movable relative to the first axis member in at least one arbitrary direction; and
   at least one elastic member that elastically holds the slide ring at a predetermined position in a plane and along the first axis and that allows the slide ring to move in the at least one arbitrary direction by elastic deformation, each of the at least one elastic member deforming only in response to a force larger than a predetermined value.

2. The manual three dimensional coordinate measuring machine according to claim 1, further comprising a probe adaptor that detachably holds the probe to a free end of the first axis member, wherein the slide ring is positioned around a periphery of the probe adaptor, and the at least one elastic member is provided between the slide ring and the probe adaptor.

3. The manual three dimensional coordinate measuring machine according to claim 1, further comprising an annunciating circuit that indicates a predetermined amount of movement of the slide ring in the arbitrary direction.

4. The manual three dimensional coordinate measuring machine according to claim 1, further comprising an error preventing circuit that cancels recording of displacements of the probe relative to the three coordinate axes in response to the probe contacting a workpiece when the slide ring moves a predetermined amount.

5. The manual three dimensional coordinate measuring machine according to claim 4, further comprising a probe adaptor that detachably holds the probe to a free end of the first axis member, wherein the error preventing circuit comprises:
   at least one fixed contact positioned on the probe adaptor;
   at least one corresponding moving contact positioned on the slide ring; and
   a touch signal interface circuit for canceling recording of the displacements based on a touch signal generated when the fixed and moving contacts contact each other; and
   wherein, when the slide ring moves by the predetermined amount at least one of the at least one moving contact contacts the corresponding one of the at least one fixed contact to trigger the touch signal interface circuit.

6. A manual three dimensional coordinate measuring machine, comprising:
   a first axis member extending along a first axis of three orthogonal coordinate axes and manually movable with respect to at least one of the three orthogonal coordinate axes;
   a probe supported by the first axis member and movable relative to the first axis member;
   a slide ring positioned at a free end of the first axis member, the slide ring movable relative to the first axis member in at least one arbitrary direction in a plane relative to the first axis while an axis of the slide ring is maintained approximately parallel to the first axis; and
   at least one elastic member that elastically holds the slide ring at a predetermined position relative to the first axis member and that allows the slide ring to move in the plane by elastic deformation, each of the at least one elastic member deforming only in response to a force larger than a predetermined value.

7. The manual three dimensional coordinate-measuring machine according to claim 6, further comprising a probe adaptor that detachably holds the probe to the free end of the first axis member, wherein the slide ring is positioned around a periphery of the probe adaptor and the at least one elastic member is provided between the slide ring and the probe adaptor.

8. The manual three dimensional coordinate measuring machine according to claim 7, wherein the probe adaptor comprises a ring mounting member and a probe holding member detachably connected to the ring mounting member.

9. The manual three dimensional coordinate measuring machine according to claim 8, wherein the ring mounting member includes a flange and the probe holding member includes a flange and a holding hole for receiving the probe, the slide ring movable relative to the probe in a plane perpendicular to the first axis by the flanges of the ring mounting member and the probe holding member.

10. The manual three dimensional coordinate measuring machine according to claim 6, further comprising an annunciating circuit that indicates a predetermined amount of movement of the slide ring.

11. The manual three dimensional coordinate measuring machine according to claim 6, further comprising an error preventing circuit that cancels recording of displacements of the probe along the three orthogonal coordinate axes in response to a predetermined amount of movement of the slide ring.

12. A probe arrangement for a manual three dimensional coordinate measuring machine, comprising:
    a first axis member extending along a first one of three orthogonal coordinate axes and movable with respect to at least one of the three orthogonal coordinate axes;
    a probe supported by the first axis member and movable relative to the first axis member:
    a slide ring positioned at a free end of the first axis member, the slide ring movable relative to the first axis member in at least one arbitrary direction; and
    at least one elastic member that elastically holds the slide ring at a predetermined position in a plane relative to the first axis member and along the first axis and that allows the slide ring to move in the at least one arbitrary direction by elastic deformation, each of the at least one elastic member deforming only in response to a force larger than a predetermined value.

13. The probe arrangement according to claim 12, further comprising a probe adaptor that detachably holds the probe to the free end of the first axis member, wherein the slide ring is positioned around a periphery of the probe adaptor and the at least one elastic member is provided between the slide ring and the probe adaptor.

14. The probe arrangement according to claim 12, further comprising an annunciating circuit that indicates a predetermined amount of movement of the slide ring in the arbitrary direction.

15. The probe arrangement according to claim 12, further comprising an error preventing circuit that cancels recording of displacements of the probe relative to the three coordinate axes in response to the probe contacting a workpiece when the slide ring moves a predetermined amount.

16. The probe arrangement according to claim 15, further comprising a probe adaptor that detachably holds the probe to the free end of the first axis member, wherein the error preventing circuit comprises:
    at least one fixed contact positioned on the probe adaptor;
    at least one corresponding moving contact positioned on the slide ring; and
    a touch signal interface circuit that cancels recording of the displacements based on a touch signal generated when the fixed and moving contacts come in contact with each other;
    wherein, when the slide ring moves by the predetermined amount, at least one of the at least one moving contact contacts the corresponding one of the at least one fixed contact to trigger the touch signal interface circuit.

17. A manual three dimensional coordinate measuring machine, comprising:
    a probe manually movable with respect to three orthogonal coordinate axes;
    a first axis member supporting the probe and extending along a first one of the three orthogonal coordinate axes;
    a slide ring positioned at a bottom side of the first axis member, the slide ring movable in an arbitrary direction;
    at least one elastic member that elastically holds the slide ring at a predetermined position in a plane and along the first axis and that allows the slide ring to move in the arbitrary direction by elastic deformation, each of the at least one elastic member deforming only in response to a force larger than a predetermined value; and
    an error preventing circuit that cancels recording of displacements of the probe relative to the three coordinate axes in response to the probe contacting a workpiece when the slide ring moves a predetermined amount.

18. The manual three dimensional coordinate measuring machine according to claim 17, further comprising a probe adaptor that detachably holds the probe to a free end of the first axis member, wherein the error preventing circuit comprises:
    at least one fixed contact positioned on the probe adaptor;
    at least one corresponding moving contact positioned on the slide ring; and
    a touch signal interface circuit for canceling recording of the displacements based on a touch signal generated when the fixed and moving contacts contact each other;
    wherein, when the slide ring moves by the predetermined amount, at least one of the at least one moving contact contacts the corresponding one of the at least one fixed contact to trigger the touch signal interface circuit.

19. A manual three dimensional coordinate measuring machine, comprising:
    a probe manually movable with respect to three orthogonal coordinate axes;
    a first axis member supporting the probe and extending along a first one of the three orthogonal coordinate axes;
    a slide ring positioned at a free end of the first axis member, the slide ring movable in an arbitrary direction in a plane relative to the first axis while an axis of the slide ring is maintained approximately parallel to the first axis;
    at least one elastic member that elastically holds the slide ring at a predetermined position relative to the first axis member and that allows the slide ring to move in the plane by elastic deformation, each of the at least one elastic member deforming only in response to a force larger than a predetermined value; and
    an error preventing circuit that cancels recording of displacements of the probe along the three orthogonal coordinate axes in response to a predetermined amount of movement of the slide ring.

20. A manual three dimensional coordinate measuring machine, comprising:
- a probe manually movable with respect to three orthogonal coordinate axes;
- a first axis member supporting the probe and extending along a first one of the three orthogonal coordinate axes;
- a slide ring positioned at a free end of the first axis member, the slide ring movable in an arbitrary direction in a plane relative to the first axis while an axis of the slide ring is maintained approximately parallel to the first axis;
- at least one elastic member that elastically holds the slide ring at a predetermined position relative to the first axis member and that allows the slide ring to move in the plane by elastic deformation, each of the at least one elastic member deforming only in response to a force larger than a predetermined value;
- a probe adaptor that detachably holds the probe to a free end of the first axis member, comprising:
- a ring mounting member, the ring member including a flange, and
- a probe holding member detachably connected to the ring mounting member and including a flange and a holding hole for receiving the probe;

wherein:
the slide ring is positioned around a periphery of the probe adaptor,
the at least one elastic member is provided between the slide ring and the probe adaptor, and
the slide ring is movable relative to the probe in a plane perpendicular to the first axis by the flanges of the ring mounting member and the probe holding member.

21. A probe arrangement for a manual three dimensional coordinate measuring machine, comprising:
- a probe manually movable with respect to three orthogonal coordinate axes;
- a first axis member supporting the probe and extending along a first one of the three orthogonal coordinate axes;
- a slide ring positioned at a free end of the first axis member, the slide ring movable in an arbitrary direction;
- at least one elastic member that elastically holds the slide ring at a predetermined position in a plane relative to the first axis member and along the first axis and that allows the slide ring to move in the arbitrary direction by elastic deformation, each of the at least one elastic member deforming only in response to a force larger than a predetermined value;
- an error preventing circuit that cancels recording of displacements of the probe relative to the three coordinate axes in response to the probe contacting a workpiece when the slide ring moves a predetermined amount.

22. The probe arrangement according to claim 21, further comprising a probe adaptor that detachably holds the probe to the free end of the first axis member, wherein the error preventing circuit comprises:
- at least one fixed contact positioned on the probe adaptor;
- at least one corresponding moving contact positioned on the slide ring; and
- a touch signal interface circuit that cancels recording of the displacements based on a touch signal generated when the fixed and moving contacts come in contact with each other;

wherein, when the slide ring moves by the predetermined amount, at least one of the at least one moving contact contacts the corresponding one of the at least one fixed contact to trigger the touch signal interface circuit.

23. A manual three dimensional coordinate measuring machine, comprising:
- a probe movable with respect to three orthogonal coordinate axes;
- a first axis member supporting the probe and extending along a first one of the three orthogonal coordinate axes, the first axis member manually movable along at least one of the three orthogonal coordinate axes upon application of a moving force;
- a slide ring positioned at a bottom side of the first axis member, the slide ring movable in at least one arbitrary direction relative to the first axis member and graspable to apply the moving force to the first axis member; and
- at least one elastic member that elastically holds the slide ring at a predetermined position in a plane and along the first axis and that allows the slide ring to move in the at least one arbitrary direction by elastic deformation, each of the at least one elastic member deforming only when the moving force is larger than a predetermined value.

24. The manual three dimensional coordinate measuring machine according to claim 23, further comprising a probe adaptor that detachably holds the probe to a free end of the first axis member, wherein the slide ring is positioned around a periphery of the probe adaptor, and the at least one elastic member is provided between the slide ring and the probe adaptor.

25. A manual three dimensional coordinate measuring machine, comprising:
- a probe movable with respect to three orthogonal coordinate axes;
- a first axis member supporting the probe and extending along a first one of the three orthogonal coordinate axes, the first axis member manually movable along at least one of the three orthogonal coordinate axes upon application of a moving force;
- a slide ring positioned at a free end of the first axis member, the slide ring graspable to apply the moving force to the first axis member, and movable in at least one arbitrary direction relative to the first axis member while an axis of the slide ring is maintained approximately parallel to the first axis; and
- at least one elastic member that elastically holds the slide ring at a predetermined position relative to the first axis member and that allows the slide ring to move in the at least one arbitrary direction by elastic deformation, each of the at least one elastic member deforming only when the moving force is larger than a predetermined value.

26. The manual three dimensional coordinate measuring machine according to claim 25, further comprising a probe adaptor that detachably holds the probe to a free end of the first axis member, wherein the slide ring is positioned around a periphery of the probe adaptor, and the at least one elastic member is provided between the slide ring and the probe adaptor.

27. A probe arrangement for a manual three dimensional coordinate measuring machine, comprising:
- a probe movable with respect to three orthogonal coordinate axes;

a first axis member supporting the probe and extending along a first one of the three orthogonal coordinate axes, the first axis member manually movable along at least one of the three orthogonal coordinate axes upon application of a moving force;

a slide ring positioned at a free end of the first axis member, the slide ring movable in at least one arbitrary direction relative to the first axis member and graspable to apply the moving force to the first axis member; and at least one elastic member that elastically holds the slide ring at a predetermined position in a plane relative to the first axis member and along the first axis and that allows the slide ring to move in the at least one arbitrary direction by elastic deformation, each of the at least one elastic member deforming only when the moving force is larger than a predetermined value.

28. The probe arrangement according to claim 27, further comprising a probe adaptor that detachably holds the probe to the free end of the first axis member, wherein the slide ring is positioned around a periphery of the probe adaptor and the at least one elastic member is provided between the slide ring and the probe adaptor.

29. A manual three dimensional coordinate measuring machine, comprising:

a probe movable with respect to three orthogonal coordinate axes;

a first axis member manually movable and extending along a first one of the three orthogonal coordinate axes, the first axis member movable along at least one of the three orthogonal coordinate axes and movably supporting the probe;

a slide ring positioned at a bottom side of the first axis member, the slide ring movable in at least one arbitrary direction relative to the first axis member; and at least one elastic member that elastically holds the slide ring at a predetermined position in a plane and along the first axis and that allows the slide ring to move in the at least one arbitrary direction by elastic deformation, each of the at least one elastic member deforming only in response to a force larger than a predetermined value.

30. The manual three dimensional coordinate measuring machine according to claim 29, further comprising a probe adaptor that detachably holds the probe to a free end of the first axis member, wherein the slide ring is positioned around a periphery of the probe adaptor, and the at least one elastic member is provided between the slide ring and the probe adaptor.

31. A manual three dimensional coordinate measuring machine, comprising:

a probe movable with respect to three orthogonal coordinate axes;

a first axis member manually movable and extending along a first one of the three orthogonal coordinate axes, the first axis member movable along at least one of the three orthogonal coordinate axes and movably supporting the probe;

a slide ring positioned at a free end of the first axis member, the slide ring movable in at least one arbitrary direction relative to the first axis member while an axis of the slide ring is maintained approximately parallel to the first axis; and at least one elastic member that elastically holds the slide ring at a predetermined position relative to the first axis member and that allows the slide ring to move in the at least one arbitrary direction by elastic deformation, each of the at least one elastic member deforming only in response to a force larger than a predetermined value.

32. The manual three dimensional coordinate measuring machine according to claim 31, further comprising a probe adaptor that detachably holds the probe to a free end of the first axis member, wherein the slide ring is positioned around a periphery of the probe adaptor, and the at least one elastic member is provided between the slide ring and the probe adaptor.

33. A probe arrangement for a manual three dimensional coordinate measuring machine, comprising:

a probe movable with respect to three orthogonal coordinate axes;

a first axis member manually movable and extending along a first one of the three orthogonal coordinate axes, the first axis member movable along at least one of the three orthogonal coordinate axes and movably supporting the probe;

a slide ring positioned at a free end of the first axis member, the slide ring movable in at least one arbitrary direction relative to the first axis member; and at least one elastic member that elastically holds the slide ring at a predetermined position in a plane relative to the first axis member and along the first axis and that allows the slide ring to move in the at least one arbitrary direction by elastic deformation, each of the at least one elastic member deforming only in response to a force larger than a predetermined value.

34. The probe arrangement according to claim 33, further comprising a probe adaptor that detachably holds the probe to the free end of the first axis member, wherein the slide ring is positioned around a periphery of the probe adaptor and the at least one elastic member is provided between the slide ring and the probe adaptor.

* * * * *